United States Patent [19]

Lodge et al.

[11] Patent Number: 4,757,531

[45] Date of Patent: * Jul. 12, 1988

[54] ENCRYPTION OF TELEVISION SIGNALS

[75] Inventors: Nicolas K. Lodge, Salisbury; Arthur G. Mason, Andover; Barry A. Flannigan, Winchester, all of United Kingdom

[73] Assignee: Independent Broadcasting Authority, London, England

[*] Notice: The portion of the term of this patent subsequent to Jan. 13, 2004 has been disclaimed.

[21] Appl. No.: 678,543

[22] PCT Filed: Mar. 28, 1984

[86] PCT No.: PCT/GB84/00106

§ 371 Date: Nov. 20, 1984

§ 102(e) Date: Nov. 20, 1984

[87] PCT Pub. No.: WO84/04013

PCT Pub. Date: Oct. 11, 1984

[30] Foreign Application Priority Data

Mar. 28, 1983 [GB] United Kingdom ................ 8308482
Jun. 30, 1983 [GB] United Kingdom ................ 8317797

[51] Int. Cl.$^4$ .............................................. H04N 7/167
[52] U.S. Cl. ......................................... 380/11; 380/14
[58] Field of Search ................ 358/114, 119, 12, 122; 380/10, 11, 14, 20

[56] References Cited

U.S. PATENT DOCUMENTS

| 4,070,693 | 1/1978 | Shutterly ............................... 380/20 |
| 4,405,942 | 9/1983 | Block et al. ......................... 358/119 |
| 4,435,393 | 6/1982 | Pearson .................................. 358/12 |
| 4,563,702 | 1/1986 | Heller et al. ........................ 358/119 |
| 4,636,851 | 1/1987 | Drury et al. ........................... 380/11 |

FOREIGN PATENT DOCUMENTS

2431809 2/1980 France ................................ 358/114

Primary Examiner—Stephen C. Buczinski
Assistant Examiner—Linda J. Wallace
Attorney, Agent, or Firm—Watson, Cole, Grindle & Watson

[57] ABSTRACT

A method of encrypting a television signal having in each ruster scan line a digital section of information and chrominance and luminance sections of information comprising cutting either or both of the chrominance and luminance sections and rotating the cut sections within a normal line period. If one of the sections is uncut, it may be translated in time with respect to the line period by having one of the rotated cut sections placed before the uncut section and one placed after the uncut section. The cutting point or points are determined by a pseudo random number generator. Receiving apparatus for receiving such an encrypted signal is also disclosed in which a complementary pseudo random number generator is used responsive to receipt of an encryption key to control addressing of a descrambling store in order to reconstitute the original signal.

7 Claims, 10 Drawing Sheets

DISPERSAL

ENCRYPTION OF TELEVISION SIGNALS

BACKGROUND OF THE INVENTION

1. Field of the Invention

The present invention relates to the transmission and reception of television signals in either digital or sampled analogue form. The preferred form of the invention is concerned with the encryption of a multiplexed analogue component (MAC) video signal.

Theoretically, with a digital or sampled analogue signal, the number of encryption methods is almost limitless. However, with video signals of finite bandwidth, care must be taken not to degrade the received picture due to the encryption. For this reason, the present invention proposes to leave unaltered the active picture time and to use the minimum specified by CCIR.

2. Prior Art

In our co-pending application published as International Publication No. WO83/03942 we have disclosed a multiplexed analogue component television signal which is encrypted for transmission and reception by authorised receipients only by dividing the signal into blocks and reordering the blocks prior to transmission. The signal within each block remains in its original order. The preferred arrangement does not split the blocks of analogue signals already present in the MAC signal.

The present invention is an improvement in or modification of the arrangement disclosed in No. WO83/03942 to the extent that it is now conceived that either or both of the original analogue blocks may be cut into a plurality of sections, and the order and/or timing of the commencement of sections altered.

Preferably, only the block containing chrominance signals is split, the block containing luminance signals being unsplit but its position in the line being altered with respect to the original signal.

BRIEF DESCRIPTION OF THE DRAWINGS

Features and advantages of the present invention will become apparent from the following description of embodiments thereof when taken in conjunction with the accompanying drawings, in which.

DETAILED DESCRIPTION

Figure 1:
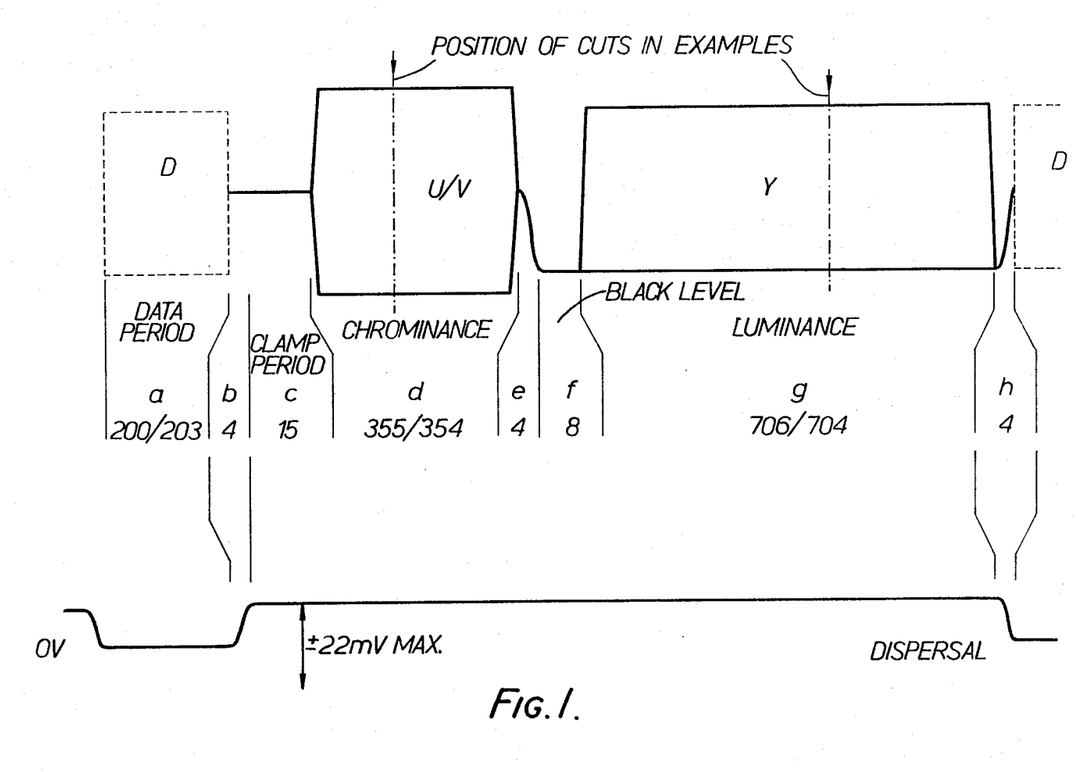
FIG. 1 shows diagrammatically one line of one form of MAC video waveform.

The preferred method of encryption is called rotation scrambling in which the active picture time is left unaltered. FIG. 1 shows one C-MAC waveform. The portion 'f' of eight samples (400 ns), has been reserved for encryption purposes. These samples will be redistributed depending upon the scrambling method used and in some circumstances may be combined with samples which allow for changes in the dispersal waveform (portion b and h). All resulting samples are used to form transitions which protect the cut edges of the scrambled waveform from distortion.

Furthermore, efficient use of the line time occurs when the luminance and chrominance 'cuts' can be made to be continuous in the scrambled state. The two transitions which would normally take place can now be reduced to a single disturbance and a saving of samples results.

In order to determine the minimum number of samples required for a transition, two step functions passed through a software simulated linear satellite transmission channel. The edges of the input steps were designed to be 120 ns, 200 ns and 250 ns raised cosine edges respectively. The simulations show the following:

If a 120 ns edge was used 490 ns would be needed for the 'cut' transition time.

If a 200 ns edge was used 260 ns would be needed to cope with the 'cut'.

If a 250 ns edge was used only 250 ns would be needed for the 'cut'.

This indicates that a very minimum of five samples should be used for the transition. Interpolation techniques can be optimised for the particular scrambling scheme used. The best interpolation to use will depend upon the number of samples available - which in turn will depend upon the method of rotation scrambling employed.

FIGS. 2 to 7 show some examples of single and double rotation scrambling schemes for the MAC signal. The clamp period may be moved as part of the scrambling process. It is thought that although this would not add significantly to the cost of a MAC decoder it may be preferable to keep the clamp period in its original position.

The cut points must be constrained to occur only during the active video periods.

The number of cutting points available should not affect the cost of the receiver. For security it is better to maximise the number of possible positions. A suggestion is that 256 positions be used in the chrominance and 512 in the limunance. The cutting points should be centered around the middle of each component. Rotation scrambling flicker caused by harmonic distortion is a main worry. It is known that variations in TV line d.c. levels of as little as 1% can cause serious flicker. It is suggested that a specification of 0.3% would need to be placed on this parameter of the scrambled signal.

The maximum peak-to-peak tolerable amplitude of harmonic distortion which would need to be specified.

Figure 8:
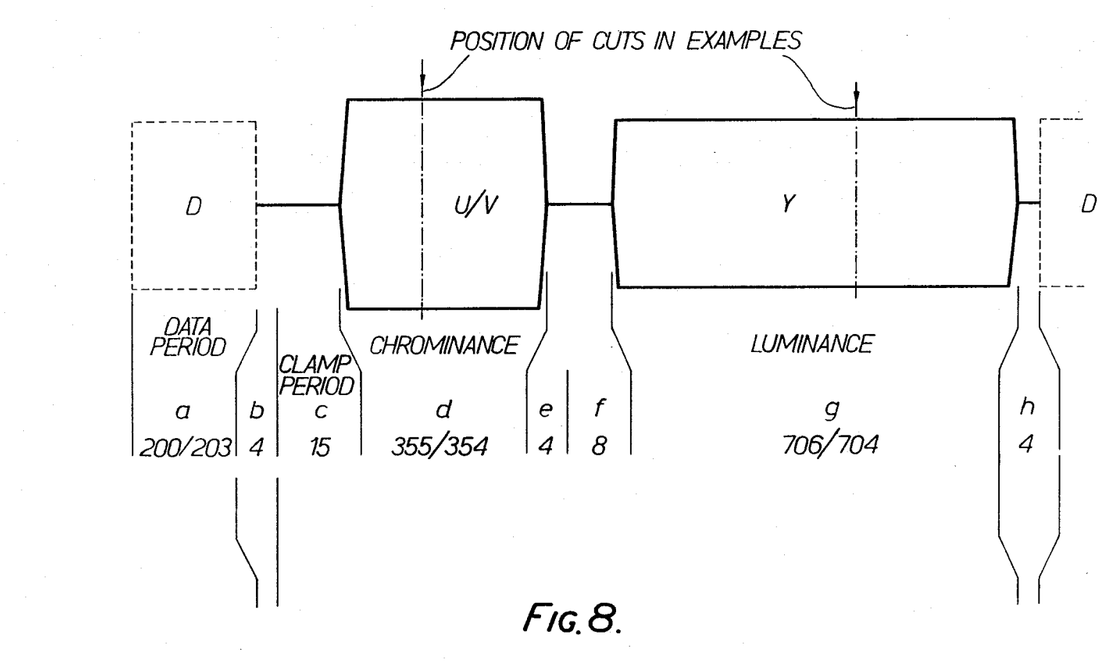
FIG. 8 shows diagrammatically one line of another form of MAC video waveform.

FIGS. 8 to 11 relate to modifications of the arrangements disclosed in relation to FIGS. 1 to 7 and differ in a number of respects e.g. the "cutting" transitions are not combined with those parts of the waveform that accommodate the changes in the dispersal signal. Further, rather than the luminance signals commencing and finishing at the black level, they commence and finish at a mid-grey level in the unscrambled signal as is shown in FIG. 8.

Figure 9:
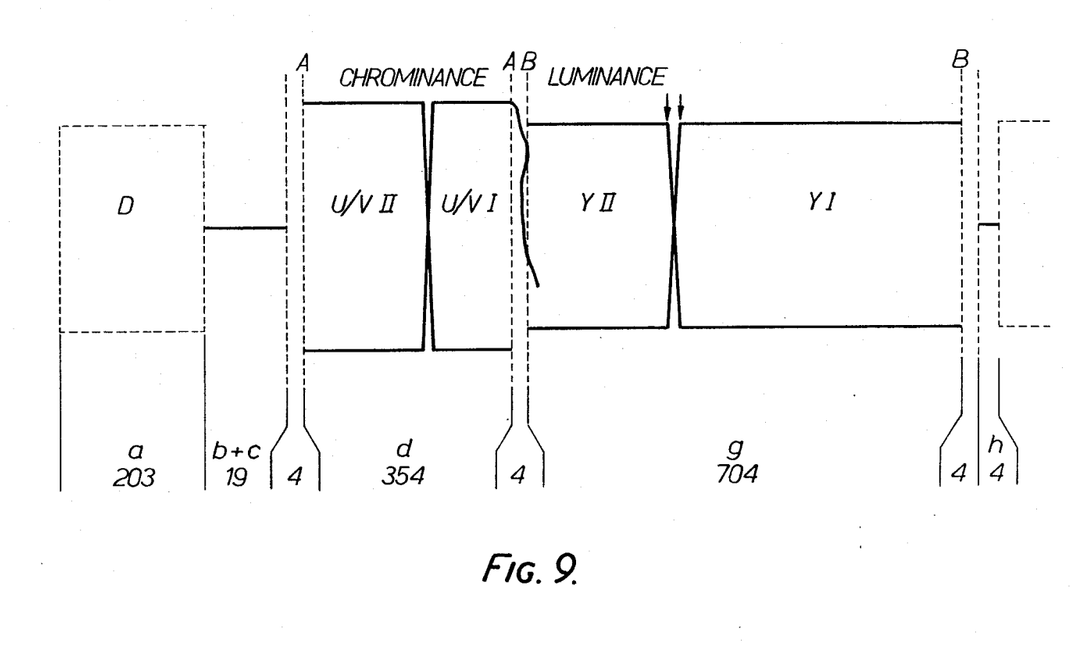
FIGS. 9 to 11 show the waveforms of various schemes for scrambling the waveform shown in FIG. 8.

FIG. 9 shows one scheme for scrambling a line of MAC video known as "component rotation" scrambling. In this scheme the periods a,b and c of the unencrypted signal remain unchanged as does the period h. The chrominance and luminance blocks are each cut and reversed in order and cross-fades are provided between the clamp period c and the first of the scrambled chrominance blocks, between the scrambled chrominance and luminance blocks and between the second of the scrambled luminance blocks and the period h at the end of the line. The total number of samples taken for all cross fades is 12 and this is the minimum number required. As shown each cross fade occupies 4 samples but the number can be altered to any 3, 6, 3, for the three cross-fades. Of course, if the active picture time can be decreased more samples remain unavailable for inclusion in these transitions.

Figure 2:
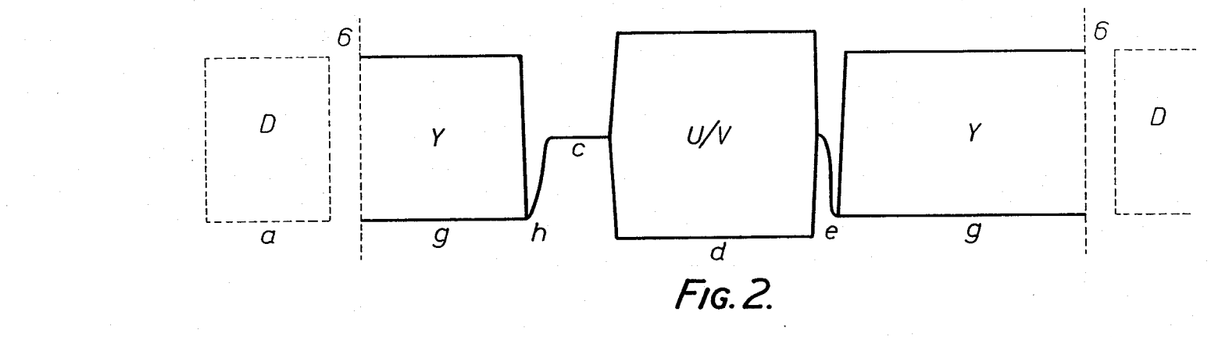
FIGS. 2 to 7 show the waveforms of various schemes for scrambling the waveform shown in FIG. 1.

The number of bits available for the scrambling and cross fading can be increased by the following scheme. It will be seen that after rotation, the junctions between the two chrominance blocks U/V I and U/V II and between the two luminance blocks YI and YII are shown as being at the mid-grey level. To achieve this it is necessary to provide say 8 sample periods at each junction. If a cross-fade were introduced at the one or both junctions, there would be a saving in samples. The security of the waveform is also increased by using this technique because the picture edges are blended into one another, are less conspicuous and consequently more difficult to detect. If only one cross-fade is being provided, it is preferred to place it between the two luminance blocks YI and YII as shown in FIG. 2.

The cross-fading is carried out with a function which prevents time domain overshoot i.e. ringing in the channel, e.g. with a raised cosine time function, e.g. a 200n sec. cosine time function.

Figure 10:
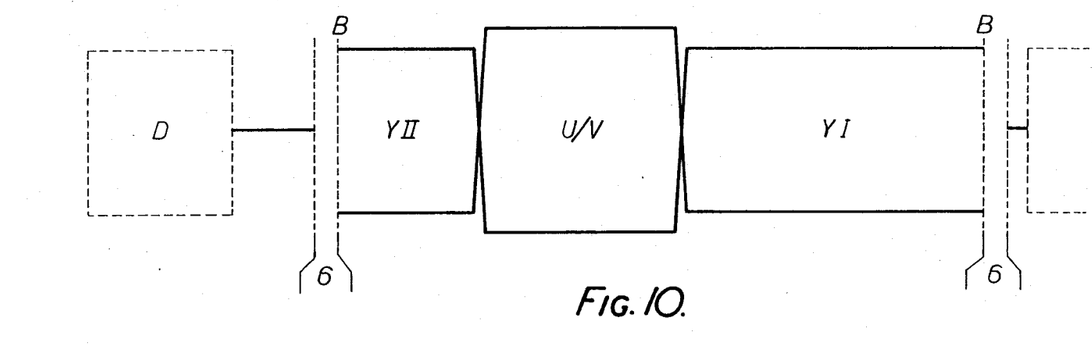
Figure 11:
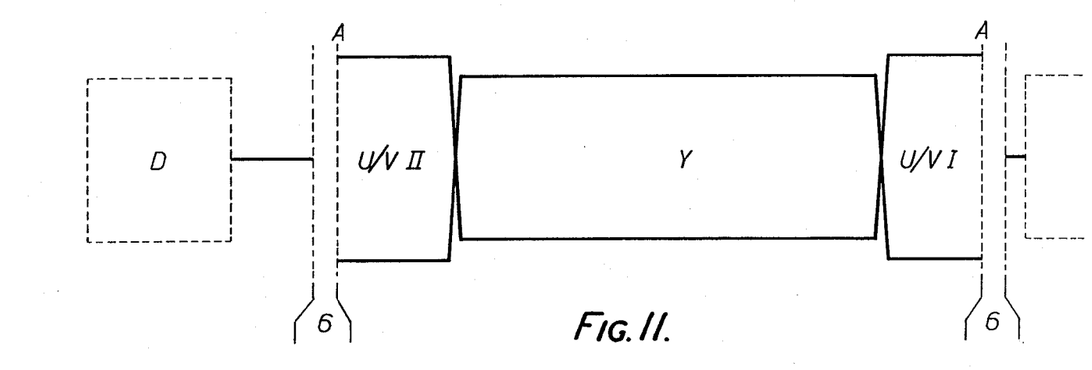

FIG. 10 shows a further scheme in which lines of the television picture have their luminance block cut into two portions, reversed in order (rotated) and the uncut chrominance block inserted between the rotated portions. Alternatively, the lines can have their chrominance block cut into two portions and the uncut luminance block inserted between the rotated portions. This is shown in FIG. 11. The schemes shown in FIGS. 10 and 11 is termed "line rotation" scrambling.

As before cross-fades are provided at one or both junctions between the chrominance and luminance signals rather than allowing the signal to revert to the mid-grey level.

Figure 3:
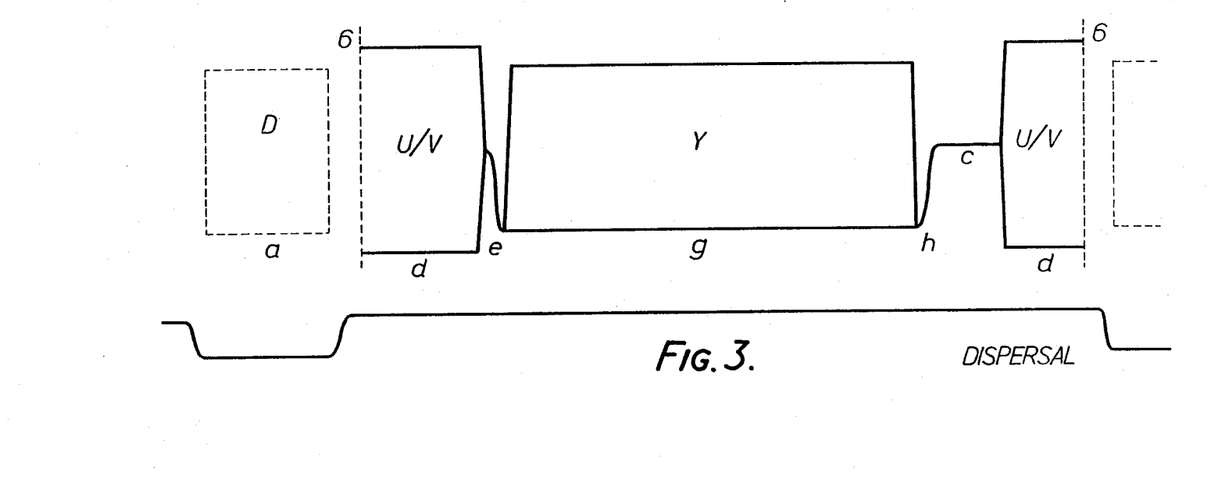
Figure 4:
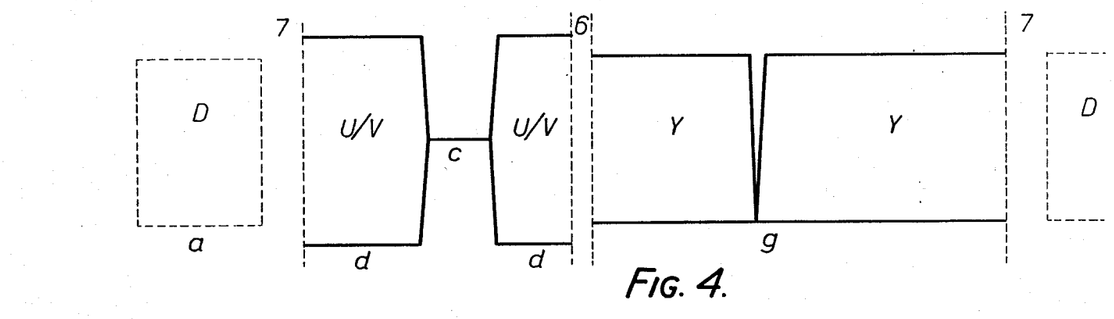
Figure 5:
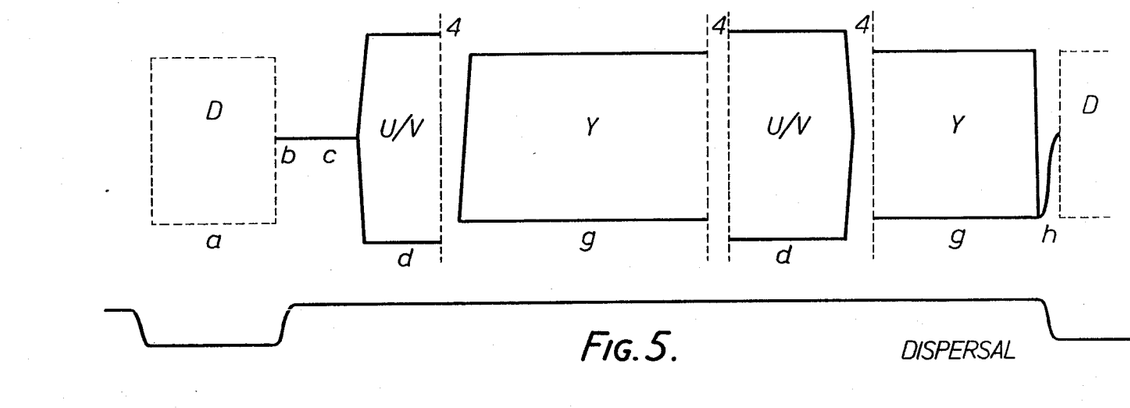
Figure 6:
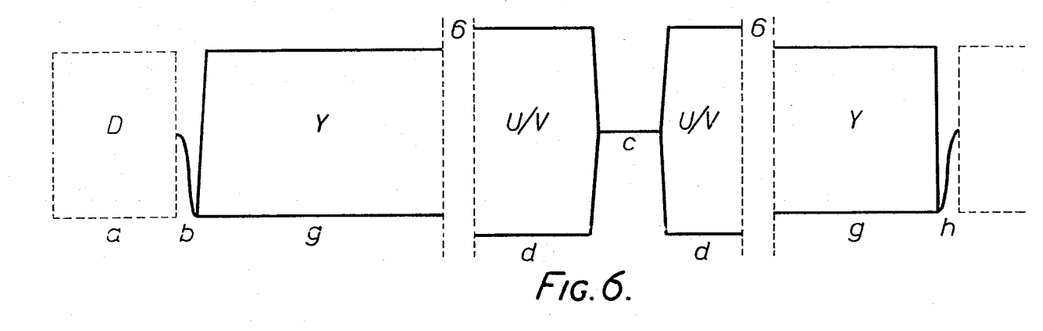
Figure 7:
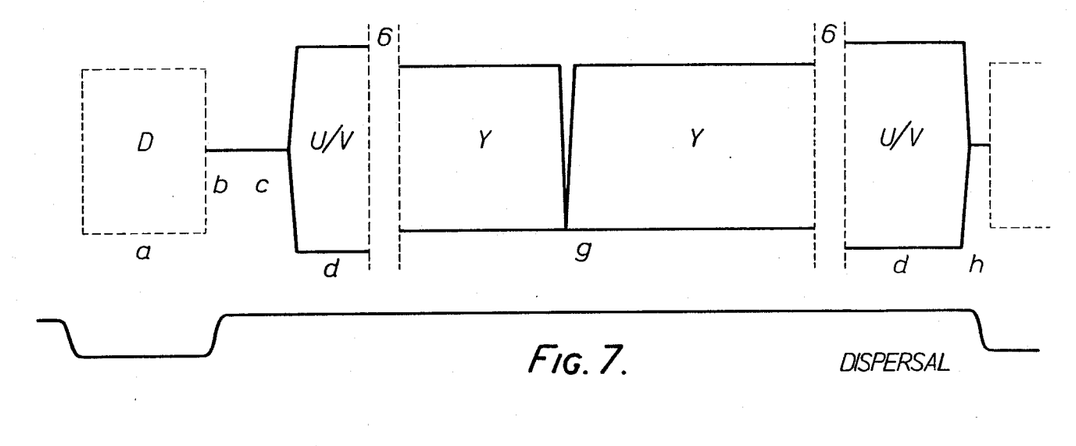

FIG. 9 is the cross-faded equivalent to FIG. 4, FIG. 11 is the cross-faded equivalent to FIG. 3 and FIG. 10 is the cross-faded equivalent to FIG. 2. It will be apparent therefore that FIGS. 5 to 7 can have cross-faded equivalents.

As mentioned above, 12 samples have been allocated for the provision of transitions before and after the component cut edges (although one of these, samples 1292, is defined to be mid-grey level).

By sharing the overlapping information in the region between the chrominance and luminance periods. This means that either 4 samples can be allocated to each transition, or 3 can be allocated to the outer and 6 to the shared one.

Some ways in which these transitions could be defined are as follows:

(a) Weighted overlapping samples

Figure 12A:
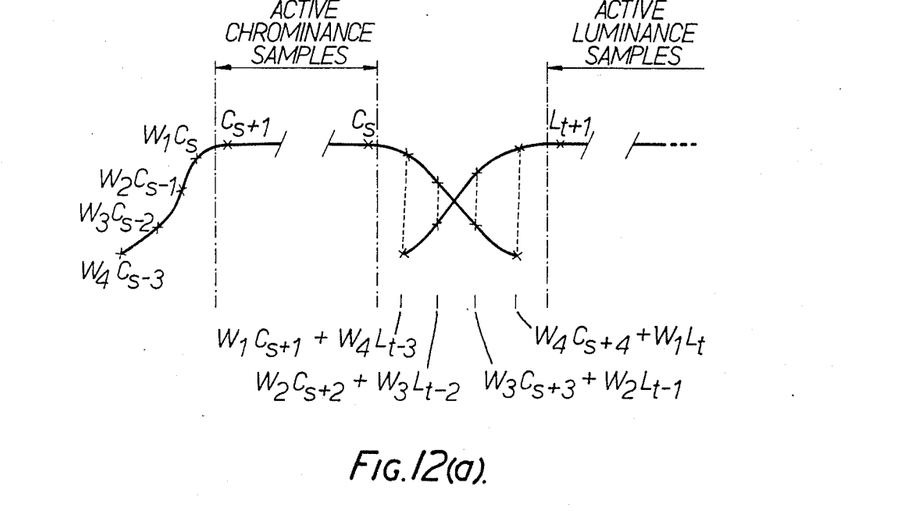
FIGS. 12(a) and 12(b) show two ways in which transitions may be achieved.

In this approach samples which occur before and after the cut edge are withdrawn from the vido compression stores and multiplied by a set of weights $W_n$ to form the transition. This is illustrated in FIG. 12(a) where samples are shown "x". An extension of this to form the shared transition between the chrominance and luminance components is merely the superposition of the weighted decrease in overlapping chrominance samples with the weighted increase in overlapping luminance samples. This is essentially a cross-fade between the component edges. Implementation of such weighted transitions in the vision coder should not present any difficulty because a digital multiplier will already have been included in the video path for shaping the blanking edges of the picture.

(b) Holding the first and last samples of the rotated component

Figure 12B:
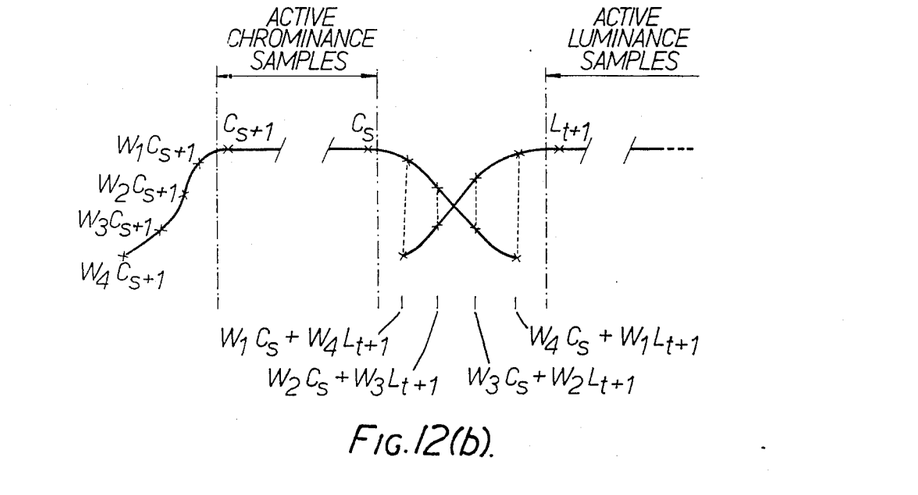

Here a transition is generated between the edges of the rotated video component and the adjacent part of the waveform by holding the sample values on either side of the transition (FIG. 12(b)). A weighting sequence is then applied to generate a fixed shaping between them. The sudden holding of the video samples will however result in the generation of an out-of-band discontinuity very close to the sensitive cut edge. This would cause an unacceptable amount of distortion after the post filtering process.

(c) Interpolation

It would be possible for an interpolation process to examine samples before and after the transition in order to invent a set of new samples which could occupy the intervening region. With enough processing these samples could be chosen to minimise some criterion such as post filter ringing. The complexity required to interpolate so many samples in such a short time makes this approach unattractive. It was therefore avoided unless other approaches proved unsatisfactory. In all these methods it is assumed that the receiver will simply cut and rerotate each component, no additional processing is required.

The most advantageous approach considered for transition generation is clearly weighting and crossfading overlapping samples.

Turning now to the apparatus for carrying out the various schemes described above, the apparatus at the transmission end is similar to that described in relation to FIG. 4 of No. WO83/03942 and will not therefore be described in detail. The cut point or points is determined by the output of a pseudo random number generator and the encryption key containing details of the pseudo random number generator is transmitted or is otherwise available to the receiver in some convenient manner which may be one of a number of previously proposed arrangements.

Figure 13:
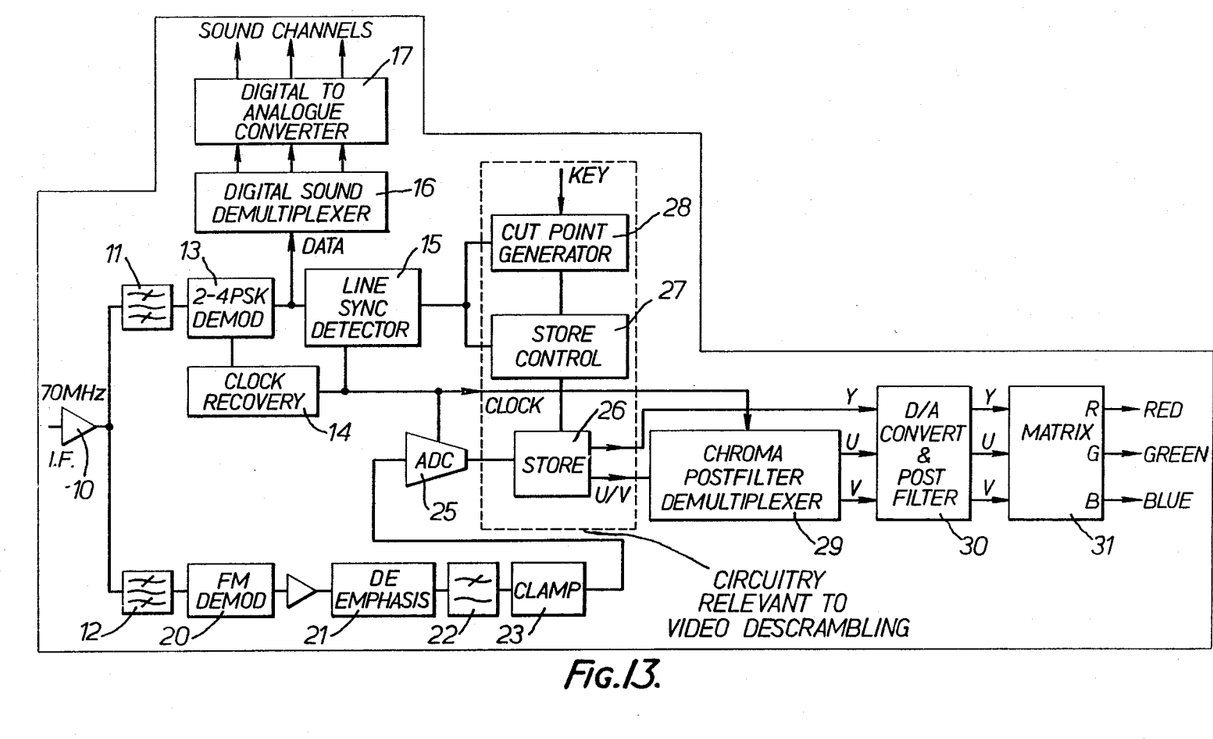
FIG. 13 shows in block diagram form a part of a receiver for receiving an encrypted television signal.

Apparatus for receiving the encrypted signal will now be described in more detail with reference to FIG. 13. The encrypted signal is received by an I.F. amplifier 10 and fed to two band pass filters 11 and 12. The bandpass filter 11 feeds the digital burst to a 2-4 PSK demodulator 13 from whose output a clock signal is recovered by a block recovery circuit 14. The output of the demodulator 13 is also fed to a line sync detector 15 controlled by a clock signal from the clock recovery circuit 14 and once line syncs have been detected data from the digital burst is fed from the demodulator 13 to a digital sound demultiplexer 16 and thence to sound channel outputs via a digital to analogue conversion circuit 17.

The output from the bandpass filter 12 is fed via an FM demodulator 20 to a de-emphasising network 21 and thence through a low pass filter 22 and clamp circuit 23 to a storage arrngement. If the storage arrangement is digital, it is necessary in this case because the MAC signal uses anlogue samples to convert each analogue sample to a digital value in an analogue to digital converter 25 before storing the resultant signal in a store 26. However, as an alternative, an analogue store such as a CCD could be used which would avoid the need for A/D conversion. Also, if the signal happened to be digital, a digital store could be used and no A/D conversion would be required.

The writing of the digitised data into the store 26 and the reading therefrom is used to descramble the signal and if required may also de-compress the video information. The writing and reading operations are controlled by a store control circuit 27 which is in turn controlled by a cut point generator circuit 28 including a pseudo random number generator which receives information relating to the key used to encrypt the original signal prior to transmission.

The result of reading the data out of the store is that luminance signals in their correct order are fed from the store 26 via a D/A converter and post filter circuit 30 to a Y,U,V/R,G,B transformation matrix 31 whose R,G,B outputs are fed to the display. Likewise, chrominance signals in their correct order are fed from the store 26 and thence via a chroma post filter and demultiplexer 29 through the D/A converter and post filter circuit 30 to the matrix 31.

Figure 14:
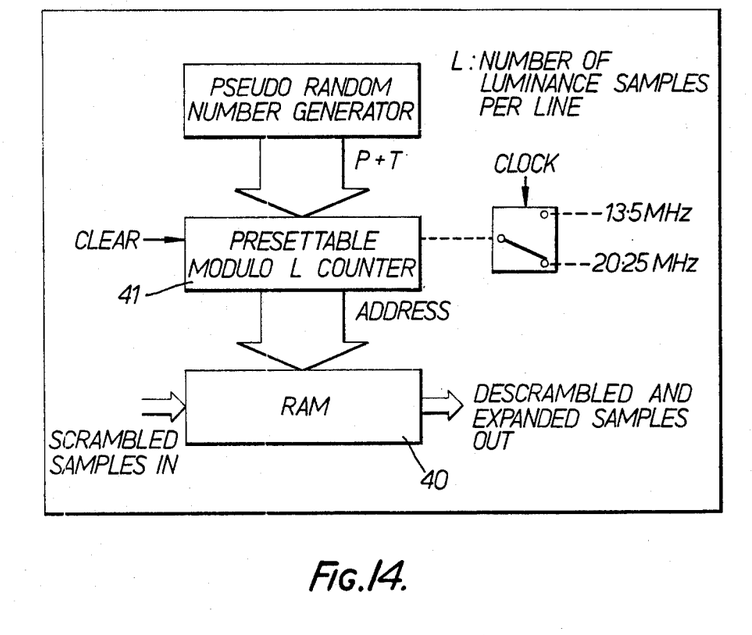
FIG. 14 shows in block diagram form a detail of part of the receiver shown in FIG. 13

So that a more complete understanding of how the store 26 and store control circuit 27 operate, attention is now directed to FIG. 14 which shows one way for descrambling the video signal components.

In principal decoding of the MAC vision transmission format by component time-expansion can be performed using a single first-in-first-out store for each component. However, the high speed organisation of read/write operations necessary makes this approach unattractive. A better arrangement is to use two stores per component. One captures the incoming compressed component with a high sampling rate (20.25 MHz) while the other simultaneously outputs the component from the previous line at a lower rate, thus performing time expansion. At the end of each line the stores switch their roles. This approach is suited to implementations using random or serial access storage. FIG. 14 shows how descrambling of the components can be performed with little modification to this decoding process by taking advantage of its cyclical nature.

Consider first the descrambling of the luminance component using RAM storage 40 (FIG. 14) (the chrominance processing is silimar). In the capturing process an address counter 41 is cleared to its zero state and then allowed to increment at 20.25 MHz so, directing L samples of the rotated input component into successive locations of the RAM 40. In the output phase which occurs during the next video line, a pseudo random number P (plus offset T) representing the location of the true line start presets the address counter 40. The counter is then incremented a further L times at the lower rate (13.5 MHz), and because of its modulo L count, causes the retrieval of the unscrambled sequence of samples from the RAM 40.

We claim:

1. A method of encrypting a line of a television signal, substantially each line of the television signal being a time multiplex of a digital section, a chrominance section and a luminance section, comprising:
    dividing the chrominance section into a plurality of blocks;
    storing said blocks, the digital section and the luminance section in a first order; and
    reading out said blocks, said digital section and said luminance section in a second order such that at least one of the blocks is read out before the luminance section and the remainder of the blocks are read out after the luminance section to produce an encrypted line, the position of the luminance section in the encrypted line being shifted relative to the position of the luminance section of the original line.

2. A method according to claim 1, wherein the dividing step comprises dividing the chrominance section into two blocks, and one of said blocks is read out before the luminance section and the other of said two blocks is read out after the luminance section in the reading out step.

3. A method according to claim 2, wherein each of said blocks includes a cut and an uncut edge, and further comprising the step of providing cross-fades at said cut and uncut edges of said blocks.

4. A method according to claim 2, wherein each of said blocks has a cut and an uncut edge, and comprising the step of providing cross-fades at said cut edges of said blocks.

5. A method according to claim 3, wherein said cross-fading is carried out with a raised cosine time function.

6. A method according to claim 4, wherein said cross-fading is carried out with a raised cosine time function.

7. Apparatus for receiving an encrypted line of a MAC television signal, the encrypted line comprising a chrominance section divided into a plurality of blocks, a digital section and a luminance section, at least one block of the chrominance section occurring earlier in the line than the luminance section and the remainder of the blocks occurring later in the line than the luminance section, and the luminance section occupying a time position in the encrypted line other than the time position of the luminance component in the original unencrypted line, comprising:
    means for receiving the encrypted signal;
    means for separating the received signal into blocks of information;
    means for writing the blocks of information into storage and for reading blocks of information out of storage; and
    control means for controlling the reading and writing of information to construct the order of the information in the original line of the MAC television signal and said control means comprises means for determining the position of the at least one division in the chrominance section which at least one division separates the section into a plurality of blocks.

* * * * *